(12) United States Patent
Arai

(10) Patent No.: US 11,157,196 B2
(45) Date of Patent: Oct. 26, 2021

(54) ERASING DEVICE

(71) Applicant: Yokogawa Electric Corporation, Tokyo (JP)

(72) Inventor: Takayuki Arai, Tokyo (JP)

(73) Assignee: YOKOGAWA ELECTRIC CORPORATION, Tokyo (JP)

(*) Notice: Subject to any disclaimer, the term of this patent is extended or adjusted under 35 U.S.C. 154(b) by 518 days.

(21) Appl. No.: 16/095,883

(22) PCT Filed: Apr. 21, 2017

(86) PCT No.: PCT/JP2017/016004
§ 371 (c)(1),
(2) Date: Oct. 23, 2018

(87) PCT Pub. No.: WO2017/188137
PCT Pub. Date: Nov. 2, 2017

(65) Prior Publication Data
US 2021/0223980 A1 Jul. 22, 2021

(30) Foreign Application Priority Data

Apr. 25, 2016 (JP) .............................. JP2016-087307

(51) Int. Cl.
*G06F 3/06* (2006.01)
*G06F 21/00* (2013.01)
*G06F 21/50* (2013.01)

(52) U.S. Cl.
CPC .......... *G06F 3/0652* (2013.01); *G06F 3/0604* (2013.01); *G06F 21/00* (2013.01); *G06F 21/50* (2013.01)

(58) Field of Classification Search
CPC ...... G06F 3/0604; G06F 3/0652; G06F 21/00; G06F 21/12; G06F 21/121; G06F 21/123;
(Continued)

(56) References Cited

U.S. PATENT DOCUMENTS 5,598,531 A * 1/1997 Hill ..................... G06F 12/1425
711/E12.099
7,668,883 B2 * 2/2010 Tran ...................... G06F 3/0623
711/159
(Continued)

FOREIGN PATENT DOCUMENTS

JP    2010-262335 A    11/2010
JP    2012-173798 A     9/2012
(Continued)

*Primary Examiner* — Richard A McCoy
(74) *Attorney, Agent, or Firm* — Osha Bergman Watanabe & Burton LLP

(57) ABSTRACT

An erasing device includes: a first connector that is detachably connected to a storage device; a second connector that is detachably connected to an information processing device; a data eraser that erases information stored in the storage device after the storage device and the information processing device are connected to one another; and an access controller that, after the information stored in the storage device is erased by the data eraser, brings the information processing device from a state where the information processing device cannot access the storage device into a state where the information processing device can access the storage device.

18 Claims, 4 Drawing Sheets

(58) Field of Classification Search
CPC .......... G06F 21/50; G06F 21/55; G06F 21/56; G06F 21/566; G06F 21/567; G06F 21/568; G06F 21/57; G06F 21/604; G06F 21/606; G06F 21/6218; G06F 21/78

See application file for complete search history.

(56) References Cited

U.S. PATENT DOCUMENTS

| | | | |
|---|---|---|---|
| 9,652,388 B2 * | 5/2017 | Shanbhogue | G06F 12/0808 |
| 9,830,099 B1 * | 11/2017 | Johansson | G06F 21/79 |
| 2010/0042782 A1 * | 2/2010 | Grynberg | G06F 12/1433 |
| | | | 711/115 |
| 2012/0255012 A1 * | 10/2012 | Sallam | H04L 63/145 |
| | | | 726/24 |
| 2012/0255013 A1 * | 10/2012 | Sallam | G06F 21/564 |
| | | | 726/24 |
| 2012/0255014 A1 * | 10/2012 | Sallam | G06F 21/564 |
| | | | 726/24 |
| 2014/0095822 A1 | 4/2014 | Shiga et al. | |
| 2015/0106562 A1 * | 4/2015 | Helmer | G06F 3/0683 |
| | | | 711/114 |
| 2016/0292420 A1 * | 10/2016 | Langton | G06F 21/567 |
| 2020/0104061 A1 * | 4/2020 | Lin | G06F 3/0623 |

FOREIGN PATENT DOCUMENTS

| | | |
|---|---|---|
| JP | 2013-008100 A | 1/2013 |
| JP | 2013-125523 A | 6/2013 |
| JP | 2013-190880 A | 9/2013 |

\* cited by examiner

ERASING DEVICE

TECHNICAL FIELD

The present invention relates to an erasing device, and more specifically, to an erasing device for erasing information in a storage device such as a USB memory.

BACKGROUND

In an information processing device which is not connected to an external network, a large-capacity storage device such as a USB memory may be used when taking out information generated in the information processing device to the outside. For example, the information processing device is a business form server in a production control system. The production control system stores the production result information in the business form server.

At this time, if the large-capacity storage device is infected with an illegal program such as a computer virus (hereinafter, collectively referred to as "virus"), when the large-capacity storage device infected with the virus is connected to the information processing device, the virus infection may spread to the information processing device.

Therefore, it has been proposed to detect a virus in a large-capacity storage device using virus detection software (Patent Literatures 1 and 2). However, infection cannot be prevented for unknown viruses. In addition, it has been proposed to prevent automatic execution of a virus file by changing a file name of an automatic execution file or hiding the automatic execution file (Patent Literatures 3 and 4). However, infection cannot be prevented for viruses that are not in a format of an automatic execution file.

In view of this, it has been proposed that a plurality of connection interfaces are provided in the large-capacity storage device, and when the information processing device changes from a state of being not connected to any of the connection interfaces to a state of being connected to one of the connection interfaces, the large-capacity storage device initializes its own storage area (Patent Literature 5). Thereby, infection can be prevented regardless of an unknown virus and a virus which is not in a form of an automatic execution file.

However, it is necessary for the large-capacity storage device of Patent Literature 5 to be connected to an information processing device of delivering side and an information processing device of receiving side simultaneously. In a case where the delivering side and the receiving side are located away from each other and these are not connected thereto simultaneously, it cannot be applied. That is, even if the large-capacity storage device is connected to the information processing device of delivering side and receives information, when the large-capacity storage device is disconnected to the information processing device of delivering side and connected to the information processing device of receiving side, the information is erased.

PATENT LITERATURE

[Patent Literature 1] Japanese Unexamined Patent Application Publication No. 2014-071887
[Patent Literature 2] Japanese Unexamined Patent Application Publication No. 2013-190880
[Patent Literature 3] Japanese Unexamined Patent Application Publication No. 2013-125523
[Patent Literature 4] Japanese Unexamined Patent Application Publication No. 2010-262335
[Patent Literature 5] Japanese Unexamined Patent Application Publication No. 2012-173798

SUMMARY

One or more embodiments of the present invention provide an erasing device which can prevent virus infection from a storage device to an information processing device, and can deliver and receive information between information processing devices in a remote place by using the storage device.

An erasing device according to one or more embodiments of the present invention includes a first connector to which a storage device is detachably connected, a second connector to which an information processing device is detachably connected, a data eraser configured to erase information stored in the storage device after the storage device and the information processing device are connected, and an access controller configured to bring the information processing device from a state in which the information processing device cannot access the storage device into a state in which the information processing device can access the storage device after the information stored in the storage device is erased by the data eraser.

The erasing device may further include an erasing start checker configured to wait until an erasing operation is performed after the storage device and the information processing device are connected, and thereafter, to cause the data eraser to start erasing.

The erasing device may further include an abnormality notifier configured to notify failure when the data eraser fails to erase.

The erasing device may further include a connection check detector configured to detect that the storage device is dismounted from the information processing device.

The erasing device may further include an access controller configured to make the information processing device inaccessible to the storage device when the connection check detector detects that the storage device is dismounted from the information processing device.

According to one or more embodiments of the present invention, when the storage device and the information processing device of delivering side are connected via the erasing device, information stored in the storage device is erased. Therefore, it is possible to prevent virus infection from the storage device to the information processing device of delivering side. Thereafter, by removing the storage device from the erasing device and directly connecting the storage device to the information processing device of receiving side, it is possible to transfer the information from the storage device to the information processing device of receiving side without erasing the information stored in the storage device. Thereby, it is possible to deliver and receive information between information processing devices in a remote place by using the storage device.

DETAILED DESCRIPTION

Figure 1A:
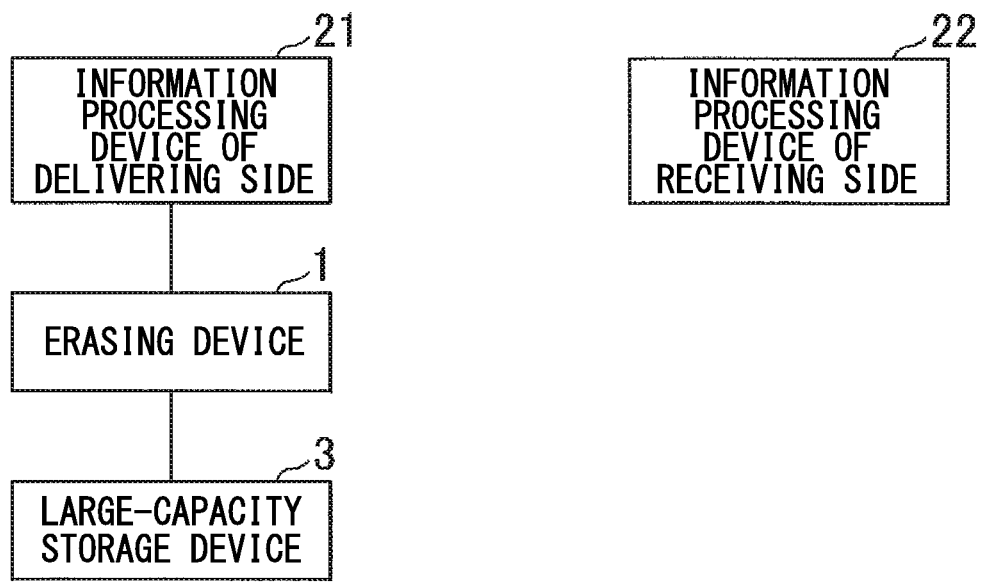
FIG. 1A is an explanation drawing for explaining a method of using the erasing device according to one or more embodiments of the present invention.

One or more embodiments of the erasing device of the present invention will be described with reference to FIGS. 1A to 3. As shown in the drawing, the erasing device 1 is an adapter which connects a large-capacity storage device (=storage device) 3 such as a USB memory, an SD card memory, a USB hard disk, etc., to an information processing device 21 of delivering side such as a server and a PC. The erasing device 1 is provided separately from the large-capacity storage device 3 and the information processing device 21.

Figure 2:
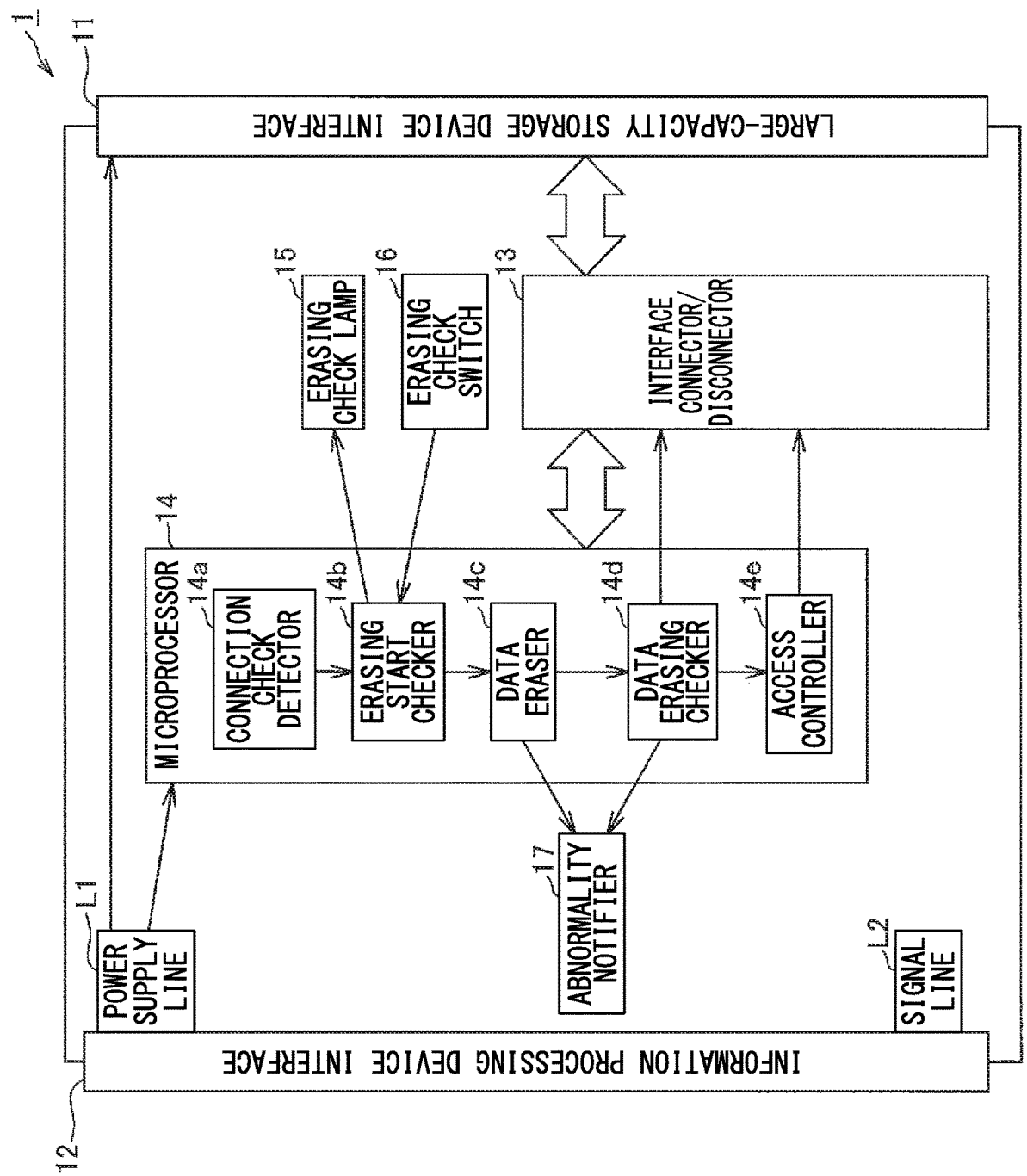
FIG. 2 is a functional block diagram showing one embodiment of the erasing device according to one or more embodiments of the present invention when erasing.
Figure 3:
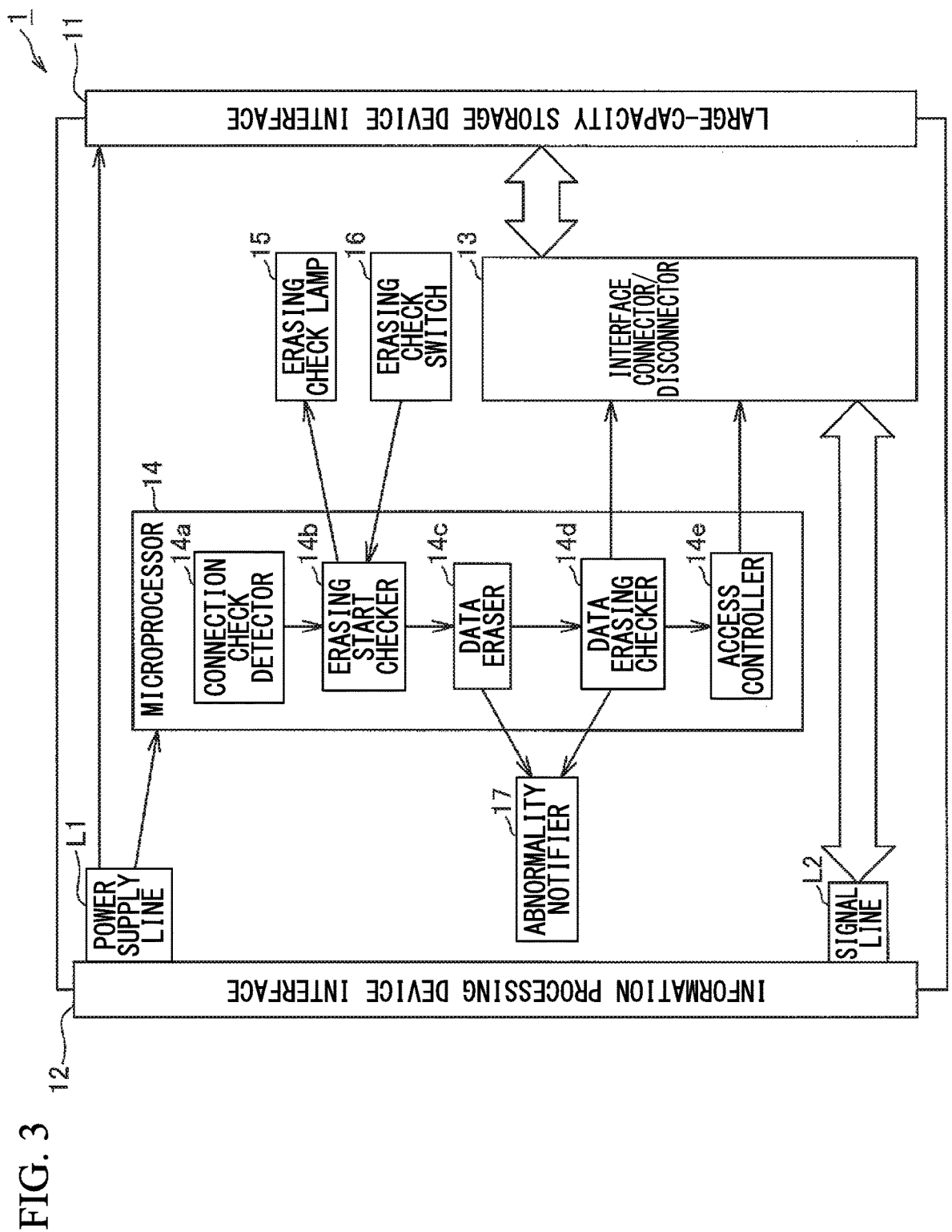
FIG. 3 is a functional block diagram showing one embodiment of the erasing device according to one or more embodiments of the present invention when using.

As shown in FIG. 2 and FIG. 3, in one or more embodiments, the erasing device 1 includes a large-capacity storage device interface 11, an information processing device interface 12, a power supply line L1, a signal line L2, an interface connector/disconnector, a microprocessor (hereinafter, referred to as MPC) 14, an erasing check lamp 15, an erasing check switch 16, and an abnormality notifier 17.

The large-capacity storage device interface 11 as a first connector has an external connection terminal to which the large-capacity storage device 3 is detachably connected.

The information processing device interface 12 as a second connector has an external connection terminal to which the information processing device 21 is detachably connected.

The power supply line L1 supplies power from the information processing device 21 to electronic components in the erasing device 1 such as the MPC 14 described later. Further, the power supply line L1 supplies power from the information processing device 21 to the large-capacity storage device 3 via the large-capacity storage device interface 11.

The signal line L2 is an electric line for transmitting a signal delivered and received between the large-capacity storage device 3 and the information processing device 21.

The interface connector/disconnector 13 includes a switch circuit or the like. The interface connector/disconnector 13 disconnects (see FIG. 2) or connects (see FIG. 3) the signal line L2 between the large-capacity storage device interface 11 and the information processing device interface 12.

The MPC 14 controls whole of the erasing device 1. As shown in FIG. 2 and so on, the MPC 14 includes a connection check detector 14a, an erasing start checker 14b, a data eraser 14c, a data erasing checker 14d, and an access controller 14e.

The connection check detector 14a detects that the large-capacity storage device 3 is connected to the large-capacity storage device interface 11 in a state of receiving power supply from the information processing device 21. After the connection check detector 14a has detected that the large-capacity storage device 3 is connected thereto, the erasing start checker 14b turns on the erasing check lamp 15 and checks that the erasing check switch 16 is turned on (erase operation) by the user's operation.

The data eraser 14c erases a part or all of the data (information) in the large-capacity storage device 3 connected to the large-capacity storage device interface 11. In a case where the data erasure has failed for some reason, the data eraser 14c controls the abnormality notifier 17 including an abnormality lamp, a buzzer, or the like to notify the user of the failure. By erasing management part of a file system, which is data (information) in the large-capacity storage device 3, it can be regarded as unformatted by the information processing device 21. For this reason, a part including the management part of the file system may be erased instead of all the data (information) in the large-capacity storage device 3. The management part of the file system may be a partition table or FAT as an example, it is not necessarily limited thereto.

The data erasing checker 14d reads data for data erasure which has been written in the large-capacity storage device 3 by the data eraser 14c to check whether or not the erasure by the data eraser 14c is successful. In a case where the data erasure has failed for some reason, the data erasing checker 14d controls the abnormality notifier 17 including an abnormality lamp, a buzzer, or the like to notify the user of the failure. Further, in a case where the erasure is successful, the data erasing checker 14d controls the interface connector/disconnector 13 to connect the signal line L2 between the large-capacity storage device interface 11 and the information processing device interface 12.

When the connection check detector 14a detects that the large-capacity storage device 3 has been dismounted from the information processing device 21, the access controller 14e makes the information processing device 21 inaccessible to the large-capacity storage device 3, returns to the initial state (S1), and waits until the large-capacity storage device 3 is detected by the connection check detector 14a. Thereby, in a case where the large-capacity storage device 3 is connected to the information processing device 21, the large-capacity storage device 3 is dismounted thereafter, and another large-capacity storage device 3 (not illustrated) is connected thereto, virus infection from the other large-capacity storage device 3 (not illustrated) can be prevented.

Figure 4:
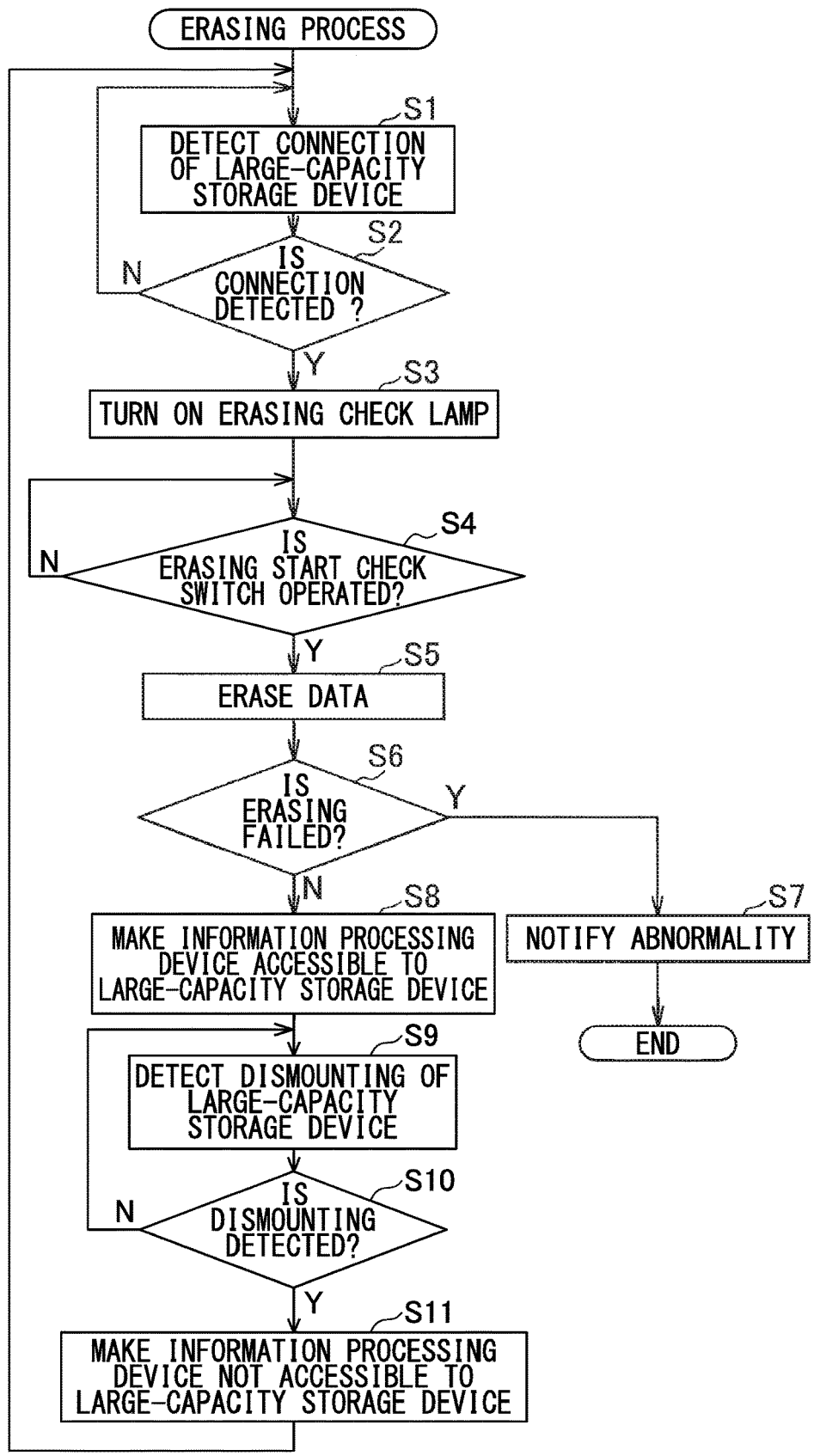
FIG. 4 is a flowchart showing a processing procedure of the microprocessor shown in FIG. 2 and FIG. 3.

Next, in one or more embodiments, operation of the erasing device of which outline has been described above will be described below with reference to the flowchart of FIG. 4. First, a procedure of delivering data of the information processing device 21 of delivering side to the large-capacity storage device 3 will be described. First, the erasing device 1 is brought into a state in which the erasing device 1 is not connected to both the large-capacity storage device 3 and the information processing device 21.

Thereafter, the large-capacity storage device 3 is connected to the large-capacity storage device interface 11 of the erasing device 1. At this time, since the erasing device 1 is not connected to the information processing device 21 and no power is supplied, nothing is operated.

Thereafter, as shown in FIG. 1A, the information processing device 21 of delivering side is connected to the information processing device interface 12 of the erasing device 1. As a result, power is supplied from the power supply line L1 connected to the information processing device interface 12 to the MPC 14, and the MPC 14 starts the erasing process shown in FIG. 4. When the power is supplied, the MPC 14 determines that the information processing device 21 is connected to the information processing device interface 12.

As shown in FIG. 2, in one or more embodiments, in an initial state (that is, in a state in which power is not supplied to the erasing device 1), the interface connector/disconnector 13 disconnects the signal line L2 between the large-capacity storage device interface 11 and the information processing device interface 12. Therefore, even if both the information processing device 21 and the large-capacity storage device 3 are connected to the erasing device 1, the information processing device 21 cannot access the large-capacity storage device 3 immediately after the connection.

In the erasing process, the MPC 14 functions as the connection check detector 14a, and detects the connection of the large-capacity storage device 3 (step S1). In step S1, the MPC 14 detects the connection of the large-capacity storage device 3 by detecting the electrical connection to the large-capacity storage device interface 11. After detecting the connection of the large-capacity storage device 3, the MPC 14 transmits a command for acquiring device information to the connected large-capacity storage device 3, and analyzes a response to the command to detect a type of the connected large-capacity storage device 3.

When the connection of the large-capacity storage device 3 is detected (Y in step S2), the MPC 14 functions as the erasing start checker 14b, and turns on the erasing check lamp 15 (step S3). This prompts the user to determine whether or not to erase the data in the large-capacity storage device 3. Thereafter, the MPC 14 waits until the erasing check switch 16 is operated (N in step S4). At this time, the state in which the information processing device 21 cannot access the large-capacity storage device 3 is maintained.

When the erasing check switch 16 is operated (Yin step S4), the MPC 14 acts as the data eraser 14c, and erases all the data in the large-capacity storage device 3 (step S5). At this time, the MPC 14 erases the data with a method adapted to the type of the large-capacity storage device 3 detected in step S1 (write and initialization instruction command corresponding to the type of the large-capacity storage device 3). For example, the data erasure is performed by a method shown as a first method and a second method described below.

According to a first method of one or more embodiments: The MPC 14 overwrites, with an arbitrary value, a management area such as a partition area or a directory area in the large-capacity storage device 3. When the information processing device 21 accesses the large-capacity storage device 3 in this state, the information processing device 21 recognizes that the large-capacity storage device 3 is unformatted. Therefore, since it is necessary for the information processing device 21 to format the large-capacity storage device 3 every time it is connected, it takes time and labor. However, since the information processing device 21 itself performs the format of the large-capacity storage device 3, a compatibility problem in which the information processing device 21 cannot write data in the large-capacity storage device 3 does not occur.

According to a second method of one or more embodiments: The MPC 14 overwrites recorded contents of the management area with an initial value to bring into a state in which file and directory do not exist. When the information processing device 21 accesses the large-capacity storage device 3 in this state, the information processing device 21 recognizes that it is empty state in which file and any directory do not exist. Therefore, it is not necessary for the information processing device 21 to format the large-capacity storage device 3 every time it is connected. However, since it is overwritten with the initial value prepared by the erasing device 1, there is a possibility that it cannot be used by the information processing device 21 nonconforming to the initial value. It is necessary for the erasing device 1 to incorporate an initial value conforming to the information processing device 21 as a target.

Next, the MPC 14 determines whether or not the data erasure in step S5 has failed (step S6). For example, this determination method may be (A) to (C) described below.

(A) In a case where there is no response from the large-capacity storage device 3 or there is a response indicating abnormality at the time of data erasure, the MPC 14 determines that the data erasure has failed.

(B) In a case where there is a response indicating that the large-capacity storage device 3 is in a write-protected state, the MPC 14 determines that the data erasure has failed.

(C) The MPC 14 functions as the data erasing checker 14d, and reads the data for data erasure written in the large-capacity storage device 3 to check. In a case where data different from the written data is read out, the MPC 14 determines that the erasure has failed.

If the MPC 14 determines that the data erasure in step S5 has failed (Y in step S6), the MPC 14 controls the abnormality notifier 17 to notify the failure (step S7), and ends the process.

On the other hand, in one or more embodiments, if the MPC 14 determines that the data erasure in step S5 has succeeded (N in step S6), the MPC 14 functions as the access controller 14e, and controls the interface connector/disconnector 13 to connect the signal line L2 between the large-capacity storage device interface 11 and the information processing device interface 12 as shown in FIG. 3, so that the information processing device 21 can access the large-capacity storage device 3 (Step S8). Further, from the viewpoint of preventing virus infection when the large-capacity storage device 3 is replaced with another large-capacity storage device 3 (not illustrated), replacement of the large-capacity storage device 3 is monitored, and the large-capacity storage device 3 is disconnected from the information processing device 21 in a case where it is replaced. Specifically, the following processing is performed. The connection check detector (14a) detects that the large-capacity storage device 3 has been dismounted from the information processing device 21 (step S9). That is, the fact that the large-capacity storage device 3 is dismounted from the information processing device 21 is detected by an electrical method. In a case where the connection check detector (14a) detects that the large-capacity storage device 3 is dismounted from the information processing device 21 (Y in step S10), the access controller (14e) makes the information processing device 21 inaccessible to the large-capacity storage device 3 (step S11), and returns to the initial state (step S1). The MPC 14 detects an electrical connection to the large-capacity storage device interface 11, and detects the connection of the large-capacity storage device 3. Thereafter, data erasing is performed through the above-described steps S2 to S5. On the other hand, in a case where the connection check detector (14a) does not detect that the large-capacity storage device 3 is dismounted from the information processing device 21 (N in step S10), it returns to the process (step S9) in which the connection check detector (14a) detects that the large-capacity storage device 3 is dismounted from the information processing device 21.

By the above-described operation, in one or more embodiments, in a case where the large-capacity storage device 3 is replaced with another large-capacity storage device 3 (not illustrated), the information processing device 21 is made inaccessible to the large-capacity storage device 3, it returns to the initial state, and the erasing process is performed. Thereby, even if the large-capacity storage device 3 (not illustrated) is infected with a virus, the information processing device 21 can be prevented from being infected by the virus.

As a result, the information processing device 21 is brought into a state in which it can access the large-capacity storage device 3 for the first time. Therefore, even if the large-capacity storage device 3 is infected, it is connected in a state in which the virus is erased. Further, the MPC 14 controls the interface connector/disconnector 13 to bring into a state in which it cannot access the large-capacity storage device 3. That is, it is brought into the same state in which an empty large-capacity storage device 3 with all the data erased is directly connected to the information processing device 21. Then, the information processing device 21 of delivering side can write into the large-capacity storage device 3.

Figure 1B:
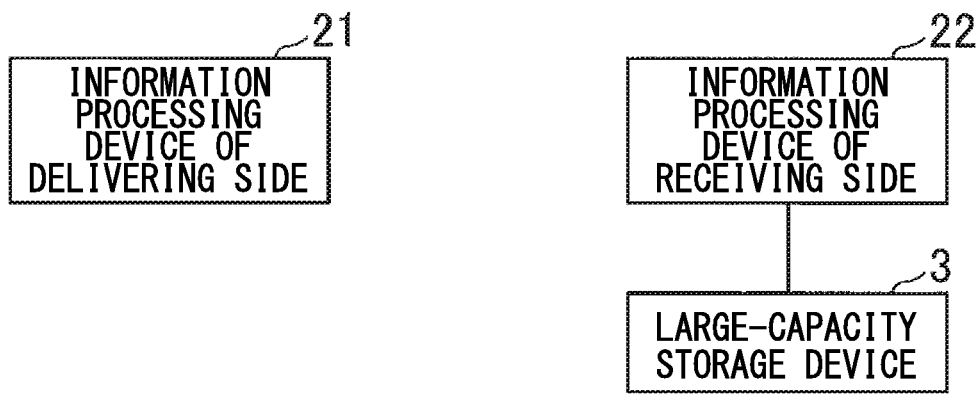
FIG. 1B is an explanation drawing for explaining a method of using the erasing device according to one or more embodiments of the present invention.

Thereafter, the user operates the information processing device 21 to write data into the large-capacity storage device 3. When the writing is completed, the erasing device 1 is dismounted from the information processing device 21. When transferring the data written in the large-capacity storage device 3 to the information processing device 22 of receiving side, as shown in FIG. 1B, the large-capacity storage device 3 is dismounted from the erasing device 1 and directly connected to the information processing device 22 of receiving side. Then, the information processing device 22 of receiving side is operated to refer to the data written in the large-capacity storage device 3.

According to the embodiments described above, the erasing device 1 includes a large-capacity storage device interface 11 to which the large-capacity storage device 3 is detachably connected, an information processing device interface 12 to which the information processing device 21 is detachably connected. After the large-capacity storage device 3 and the information processing device 21 are connected, the MPC 14 erases the data stored in the large-capacity storage device 3. Thereafter, the MPC 14 brings the information processing device 21 from a state in which the information processing device 21 cannot access the large-capacity storage device 3 into a state in which the information processing device 21 can access the large-capacity storage device 3.

As a result, when the large-capacity storage device 3 and the information processing device 21 of delivering side are connected via the erasing device 1, since the data stored in the large-capacity storage device 3 is erased, virus infection from the large-capacity storage device 3 to the information processing device 21 of delivering side can be prevented. Thereafter, by detaching the large-capacity storage device 3 from the erasing device 1 and directly connecting it to the information processing device 22 of receiving side, the data stored in the large-capacity storage device 3 is not erased, and the data is delivered from the large-capacity storage device 3 to the information processing device 22 of receiving side. As a result, information can be delivered and received between the information processing devices 21 and 22 in a remote place by using the large-capacity storage device 3.

Further, according to the above-described embodiments, the MPC 14 waits until the erasing operation is performed after the large-capacity storage device 3 and the information processing device 21 are connected, and thereafter, the MPC 14 performs erasing. As a result, it is not automatically erased when the large-capacity storage device 3 and the information processing device 21 are connected to the erasing device 1. Therefore, even if the large-capacity storage device 3 of which data is not wanted to be erased is connected to the erasing device 1 mistakenly, the data is not erased unless the user performs erasing operation.

Further, according to the above-described embodiments, the MPC 14 further includes an abnormality notifier 17 which notifies failure when erasing has failed. Thereby, it is possible for the user to know that it cannot be erased.

According to the embodiments described above, the information processing device 21 is connected after the large-capacity storage device 3 is connected to the erasing device 1, but it is not limited thereto. Even if the large-capacity storage device 3 is connected after the information processing device 21 is connected to the erasing device 1, the same effect can be achieved.

Further, according to the above-described embodiments, the MPC 14 erases the data in the large-capacity storage device 3 after waiting for the erasing operation performed by the user, but it is not limited thereto. For example, the MPC 14 may automatically erase the data in the large-capacity storage device 3 when the large-capacity storage device 3 and the information processing device 21 are connected to the erasing device 1.

Further, according to the above-described embodiments, the erasing device 1 receives power supplied from the information processing device 21, but it is not limited thereto. It may be provided with a power source such as a battery, and it may receive power supply from the power source. In this case, the erasing device 1 needs to detect that the information processing device 21 is connected.

In addition, each of the above-described embodiments merely shows a representative form of the present invention, and the present invention is not limited to these embodiments. That is, those skilled in the art can perform various modifications within a range not deviating from the gist of the present invention in accordance with the knowledge that is conventionally known. As long as the configuration of the sheet feeding device of the present invention is still obtained by such modifications, it is within the scope of the present invention.

REFERENCE SIGNS LIST

1 Erasing device
11 Large-capacity storage device interface (first connector)
12 Information processing device interface (second connector)
14b Erasing start checker
14c Data eraser
14e Access controller
17 Abnormality notifier Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An erasing device comprising:
a microprocessor having memory coupled thereto;
a data eraser;
an access controller;
a first connector that is detachably connected to a storage device;
a second connector that is detachably connected to an information processing device;
an input power supply line for:

receiving power from the information processing device when the information processing device is connected to the second connector; and powering the microprocessor and the memory with the received power;

an output power supply line connected to the input power supply line for supplying the received power to the storage device when the storage device is connected to the first connector;

a signal line, operable by the access controller, to selectively allow the information processing device to access the storage device by controlling the signal line to either allow or not allow the access;

when the information processing device is connected to the second connector, and when the storage device is connected to the first connector;

an erasing check lamp; and an erasing check switch;

wherein the memory comprises instructions that when executed by the microprocessor, cause the erasing device to:

turn on the erasing check lamp to prompt a user to determine whether or not to erase the information stored in the storage device, cause the data eraser to erase information stored in the storage device after the storage device and the information processing device are connected to one another and when the erasing check switch is operated by the prompted user, and cause the access controller, after the information stored in the storage device is erased by the data eraser, to operatively control the signal line to transition the information processing device from a state where the information processing device cannot access the storage device to a state where the information processing device can access the storage device.

2. The erasing device according to claim 1, further comprising:

an erasing start checker that causes the data eraser to start erasing after waiting until an erasing operation is performed after the storage device and the information processing device are connected to one another.

3. The erasing device according to claim 1, further comprising:

an abnormality notifier that notifies failure when the data eraser fails to erase.

4. The erasing device according to claim 1, further comprising:

a connection check detector that detects that the storage device is detached from the information processing device.

5. The erasing device according to claim 4, further comprising:

wherein the access controller makes the information processing device inaccessible to the storage when the connection check detector detects that the storage device is detached from the information processing device.

6. The erasing device according to claim 1, further comprising:

a data erasing checker that checks whether erasure of the information is successful.

7. The erasing device according to claim 6, wherein the data eraser further writes data for data erasure in the storage device, and wherein the data erasing checker further reads the data for data erasure that has been written in the storage device to check whether erasure of the information is successful.

8. The erasing device according to claim 6, further comprising:

an interface connector/disconnector that disconnects or connects the signal line between the first connector and the second connector.

9. The erasing device according to claim 8, further comprising:

wherein the interface connector/disconnector disconnects the signal line between the first connector and the second connector in an initial state, and wherein when the erasure by the data eraser is successful, the data erasing checker controls the interface connector/disconnector to connect the signal line between the first connector and the second connector.

10. An erasing system comprising:

a storage device;

an information processing device; and an erasing device comprising:

a microprocessor having memory coupled thereto;

a data eraser;

an access controller;

a first connector that is detachably connected to the storage device;

a second connector that is detachably connected to the information processing device;

an input power supply line for:

receiving power from the information processing device when the information processing device is connected to the second connector, and powering the microprocessor and the memory with the received mixer;

an output power supply line connected to the input power supply line for supplying the received power to the storage device when the storage device is connected to the first connector;

a signal line, operable by the access controller, to selectively allow the information processing device to access the storage device by controlling the signal line to either allow or not allow the access;

when the information processing device is connected to the second connector, and when the storage device is connected to the first connector;

an erasing check lamp; and an erasing check switch, wherein the memory comprises instructions that when executed by the microprocessor, cause the erasing device to:

turn on the erasing check lamp to prompt a user to determine whether or not to erase the information stored in the storage device, cause the data eraser to erase information stored in the storage device after the storage device and the information processing device are connected to one another and when the erasing check switch is operated by the prompted user, and cause the access controller, after the information stored in the storage device is erased by the data eraser, to operatively control the signal line to transition the information processing device from a state where the information processing device cannot access the storage device to a state where the information processing device can access the storage device.

11. The erasing system according to claim 10, wherein the erasing device further comprises:
an erasing start checker that causes the data eraser to start erasing after waiting until an erasing operation is performed after the storage device and the information processing device are connected to one another.

12. The erasing system according to claim 10, wherein the erasing device further comprises:
an abnormality notifier that notifies failure when the data eraser fails to erase.

13. The erasing system according to claim 10, wherein the erasing device further comprises:
a connection check detector that detects that the storage device is detached from the information processing device.

14. The erasing system according to claim 13,
wherein the access controller makes the information processing device inaccessible to the storage device when the connection check detector detects that the storage device is detached from the information processing device.

15. The erasing system according to claim 10, wherein the erasing device further comprises:
a data erasing checker that checks whether erasure of the information is successful.

16. The erasing system according to claim 15,
wherein the data eraser further writes data for data erasure in the storage device, and
wherein the data erasing checker further reads the data for data erasure that has been written in the storage device to check whether erasure of the information is successful.

17. The erasing system according to claim 15, wherein the erasing device further comprises:
an interface connector/disconnector that disconnects or connects the signal line between the first connector and the second connector.

18. The erasing system according to claim 17, further comprising:
wherein the interface connector/disconnector disconnects the signal line between the first connector and the second connector in an initial state, and
wherein when the erasure by the data eraser is successful, the data erasing checker controls the interface connector/disconnector to connect the signal line between the first connector and the second connector.

* * * * *